(12) United States Patent
Narishima et al.

(10) Patent No.: US 7,635,139 B2
(45) Date of Patent: Dec. 22, 2009

(54) LATERAL DISPLACEMENT PREVENTING DEVICE FOR STABILIZER

(75) Inventors: Hidetaka Narishima, Chiba (JP); Masahiko Shimizu, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 103 days.

(21) Appl. No.: 11/547,584

(22) PCT Filed: Mar. 25, 2005

(86) PCT No.: PCT/JP2005/005572

§ 371 (c)(1), (2), (4) Date: Oct. 3, 2006

(87) PCT Pub. No.: WO2005/092648

PCT Pub. Date: Oct. 6, 2005

(65) Prior Publication Data

US 2007/0074940 A1 Apr. 5, 2007

(30) Foreign Application Priority Data

Mar. 26, 2004 (JP) .............................. 2004-092497

(51) Int. Cl.
*B60G 3/12* (2006.01)
*F16L 33/00* (2006.01)
*F16L 25/00* (2006.01)

(52) U.S. Cl. .................... 280/124.13; 280/124.137; 280/124.149; 285/252; 285/420

(58) Field of Classification Search ............ 280/124.13, 280/124.137, 124.149, 124.152; 285/252, 285/420
See application file for complete search history.

(56) References Cited

U.S. PATENT DOCUMENTS

| 4,033,605 | A | * | 7/1977 | Smith et al. ............... 280/6.157 |
| 4,203,615 | A | * | 5/1980 | Cislo et al. ............ 280/124.106 |
| 5,145,273 | A | | 9/1992 | Hellon et al. |
| 5,150,503 | A | | 9/1992 | Müller |
| 5,185,908 | A | | 2/1993 | Oetiker |

(Continued)

FOREIGN PATENT DOCUMENTS

EP 0405109 1/1991

(Continued)

OTHER PUBLICATIONS

The International Search Report and Written Opinion dated May 17, 2005, App. No. PCT/JP2005/005572.

(Continued)

*Primary Examiner*—Toan C To
(74) *Attorney, Agent, or Firm*—McCracken & Frank LLP

(57) ABSTRACT

A lateral displacement preventing device for a stabilizer, the device including a flat plate having a first end portion and a second end portion and having an upper surface which contacts the stabilizer and a lower surface at a side that is opposite from the upper surface, and cut-out step portions formed by recessing each of an upper surface of the first end portion and a lower surface of the second end portion. The flat plate is wrapped, along a surface of the plate, around an outer periphery of the stabilizer at a predetermined position thereon and clamped, the cut-out step portions are overlapped, and both of the end portions are fixed at overlapping portions thereof.

13 Claims, 5 Drawing Sheets

U.S. PATENT DOCUMENTS

| | | | |
|---|---|---|---|
| 5,352,055 A | 10/1994 | Hellon et al. | |
| 5,368,337 A * | 11/1994 | Torres | 285/114 |
| 5,645,364 A | 7/1997 | Hodozuka et al. | |
| 5,678,845 A * | 10/1997 | Stuart | 280/124.116 |
| 5,857,800 A | 1/1999 | Nell | |
| 6,481,061 B1 | 11/2002 | Andre et al. | |
| 6,685,381 B1 | 2/2004 | Sugita et al. | |
| 2003/0111817 A1 | 6/2003 | Fader et al. | |

FOREIGN PATENT DOCUMENTS

| | | |
|---|---|---|
| FR | 2 664 347 | 1/1992 |
| JP | 58-124382 | 8/1983 |
| JP | 04-317815 | 11/1992 |
| JP | 06-243802 | 9/1994 |
| JP | 07-009135 | 1/1995 |
| JP | 10-309921 | 11/1998 |
| JP | 11-210713 | 8/1999 |
| JP | 2000079819 | 3/2000 |
| JP | 2000-142068 | 5/2000 |
| JP | 2001-165127 | 6/2001 |
| JP | 2001-268949 | 9/2001 |
| WO | WO 00/50183 | 8/2000 |

OTHER PUBLICATIONS

Office Action dated Mar. 20, 2007, Pat. Appl. No. 2004-092497.
European Search Report dated Apr. 23, 2007, Appl. No. EP 05721499 (3 pages).

* cited by examiner

LATERAL DISPLACEMENT PREVENTING DEVICE FOR STABILIZER

BACKGROUND OF THE INVENTION

1. Field of the Invention

The present invention relates to a lateral displacement preventing device for a stabilizer, which prevents a stabilizer that is used as a shock absorber for a wheel in a vehicle or the like from changing position in an axial direction at the time of travel.

2. Description of the Related Art

FIG. 2 is a perspective view of a stabilizer 1 shown in Japanese Patent Application Laid-Open (JP-A) No. 2000-79819. The stabilizer 1 is a type of torsion spring made of a bar, the whole of which is elastic, and formed in a squared U-shape by bending both end portions 3,3 in the same direction at right angles with respect to a central base portion 2. The central base portion 2 is pivotably supported at a vehicle body structure and both end portions 3,3 are connected to an axle.

The stabilizer 1 is configured so as to convert energy generated by the rolling motion of the vehicle body at the time of travel into torsional motion of the base 2 and absorb the same. However, when lateral displacement occurs in which the stabilizer 1 changes position in the axial direction of the base portion 2, the axle is affected, and traveling performance is deteriorated. Therefore, there is need to prevent lateral displacement in which the stabilizer 1 is displaced in the axial direction of the base portion 2. As one means for preventing this lateral displacement, a means has been used wherein flange-shaped portions 4 having an increased diameter are locally formed in the vicinity of a position at which the base portion is pivotably supported, and side surfaces of these flange-shaped portions 4 are made to abut against a member at the vehicle body floor structure side.

Further, as another lateral displacement preventing device, a device shown in JP-A No. 2000-142068 is known. That is, as shown in FIG. 3, a means has been used wherein an inner ring member 5 made of rubber or the like having a large coefficient of friction is wound at the vicinity of the position at which the base portion of the stabilizer 1 is pivotably supported, a central portion outer periphery of the inner ring member 5 is tightly wrapped with a sheet metal band 6, and frictional resistance force is added to a fixing surface 7 so as to prevent the inner ring member 5 from sliding with respect to the base member 2, and a side surface of the inner ring member 5 is made to abut against a pivoted member at the vehicle body floor structure side.

Furthermore, as another lateral displacement preventing device, a device shown in U.S. Pat. No. 5,857,800 is known. Conventionally, as shown in FIG. 4, a flat plate 8 is plastically deformed into a C-shape and clamped around the slider 1, and both end faces of the flat plate 8 are welded to each other with a weld metal W. However, since the surface of the stabilizer 1 is directly exposed at a gap of a seam of the both end faces of the flat plate 8, there is a risk of the weld metal directly contacting the surface of the stabilizer 1 from that gap at the time of welding. In a case where the weld metal has directly contacted the surface of the stabilizer 1, the most conspicuous effect is change in the surface hardness of the stabilizer 1, and, as a result thereof, there is potential for becoming an origin of breakage of the stabilizer 1. Moreover, since the lateral displacement preventing device is installed in the vicinity of a position at which the torsion generated stress of the stabilizer 1 is highest, this becomes a cause of marked reduction in the durability life span of the stabilizer 1.

This will be explained using one example of experimental results. When divided according to the weld metal, the heat affected zone (HAZ region, i.e., the region of change in hardness due to thermal effect), and the stabilizer base material, the change in surface hardness at the weld portion is as shown in FIG. 5. That is, the surface hardness exhibits the highest hardness in the HAZ portion, and this portion is likely to become an origin of breakage. Note that, in FIG. 5, the range of 0.0 to 1.6 mm in depth from the surface on the horizontal axis is the original stabilizer base material, and 0.0 to −1.6 mm represents the raised portion of weld metal.

In U.S. Pat. No. 5,857,800, it is disclosed that, in order to avoid adverse effects at the time of welding, two halved rings 9,10 are connected at a hinge portion 11, the hinge portion 11 is plastically deformed, and welding is carried out at a weld portion 12 provided at an opposite side from the hinge portion, as shown in FIGS. 6A and 6B.

In the lateral displacement preventing device shown in FIG. 2, since compression direction thrusting force is applied to the base portion 2 of the stabilizer 1 to plastically deform the same, there is a problem in that a production process is complicated. In the lateral displacement preventing device shown in FIG. 3, large clamping force cannot be expected of the sheet metal band 6, and thus, there is a problem in that the inner ring member 5 slides when it receives a large lateral direction force. In the lateral displacement preventing device shown in FIG. 4, as discussed above, heat at the time of welding is directly transmitted to the stabilizer 1 and has adverse effects on the stabilizer 1. In the lateral displacement preventing device shown in FIGS. 6A and 6B, the half-ring form is complicated, and thus the device becomes costly. Further, a certain amount of space is necessary for providing the weld portion 12, and this is disadvantageous from the standpoint of securing space.

SUMMARY OF THE INVENTION

Accordingly, the present invention provides a lateral displacement preventing device for a stabilizer, which does not have these problems.

The present invention has been achieved in order to solve the above-mentioned problems and has the following structure.

A first aspect of the present invention is to provide a lateral displacement preventing device for a stabilizer, the device comprising a flat plate having a first end portion and a second end portion and having an upper surface which contacts the stabilizer and a lower surface at a side that is opposite from the upper surface, and cut-out step portions formed by recessing each of an upper surface of the first end portion and a lower surface of the second end portion, wherein the flat plate is wrapped, along a surface of the plate, around an outer periphery of the stabilizer at a predetermined position thereon and clamped, the cut-out step portions are overlapped, and both of the end portions are fixed at overlapping portions thereof.

According to the first aspect of the invention, a fixed portion may be a weld portion formed by welding, and the weld portion may be formed at overlapping portions of a distal end of the cut-out step portion of the first end portion and a base portion of the cut-out step portion of the second end portion. Further, the weld portion may be formed at a substantially central position of overlapping portions of the cut-out step portion of the first end portion and the cut-out step portion of the second end portion.

A second aspect of the present invention is to provide a method of producing a lateral displacement preventing device for a stabilizer, the method comprising providing a flat plate having a first end portion and a second end portion and having an upper surface which contacts the stabilizer and a lower surface at a side that is opposite from the upper surface, recessing an upper surface of the first end portion to form a cut-out step portion, recessing a lower surface of the second end portion to form a cut-out step portion, wrapping the flat plate, along a surface of the plate, around an outer periphery of the stabilizer at a predetermined position thereon so that the cut-out step portion of the first end portion and the cut-out step portion of the second step portion are overlapped and clamping the flat plate, and fixing overlapping portions of the cut-out step portions by welding.

Although a thickness of the flat plate also depends on a size of the stabilizer, in order to exert the function of preventing lateral displacement, a thickness of about 3.0 to 8.0 mm and a width of about 10 to 20 mm are sufficient. Further, in a case where the welding is carried out at overlapping portions of a distal end of the cut-out step portion of the first end portion and a base portion of the cut-out step portion of the second end portion, the step portion at the lower side of the upper side end portion may be formed like a groove at a hypotenuse. In a case where the welding is carried out at a substantially central portion of the cut-out step portion of the first end portion and the cut-out step portion of the second end portion, welding may be carried out as is, or a recess may be formed at the weld portion. In either case, since a gap of butting portions of the two end portions does not directly face the surface of the stabilizer, welding heat is not directly transmitted to the surface of the stabilizer. Accordingly, the stabilizer is not altered by the heat. Further, the structure is simple without taking up a large amount of space, and production and installation are easy.

In the lateral displacement preventing device for a stabilizer according to the present invention, the stabilizer is not altered by heat. Further, the structure is simple without taking up a large amount of space, and production and installation are easy.

Embodiments

DETAILED DESCRIPTION OF THE INVENTION

Next, embodiments of the present invention will be explained according to drawings.

Figure 1A:
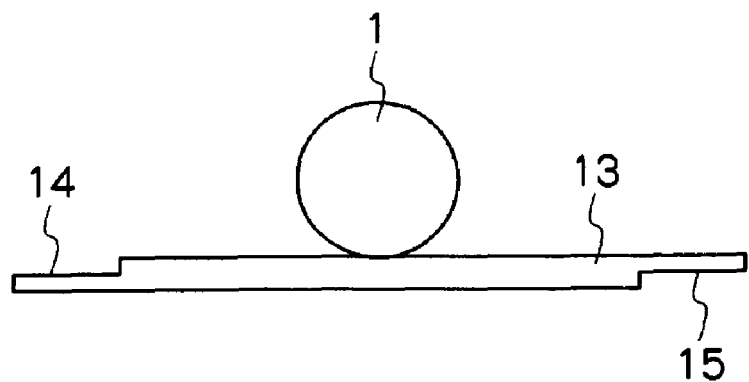
FIG. 1A is an explanatory drawing of a lateral displacement preventing device according to an embodiment of the present invention.
Figure 1B:
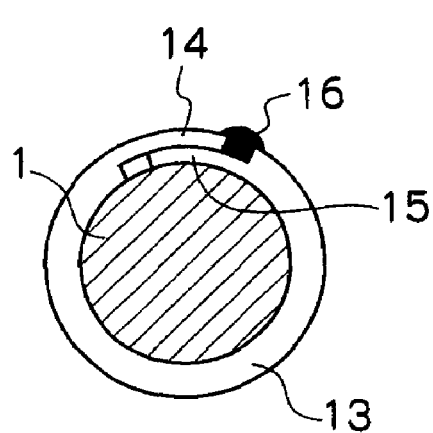
FIG. 1B is a sectional view of a lateral displacement preventing device according to one embodiment of the present invention.
Figure 1C:
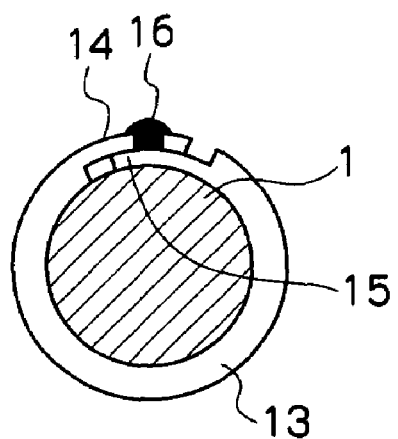
FIG. 1C is a sectional view of a lateral displacement preventing device according to another embodiment of the present invention.
Figure 1D:
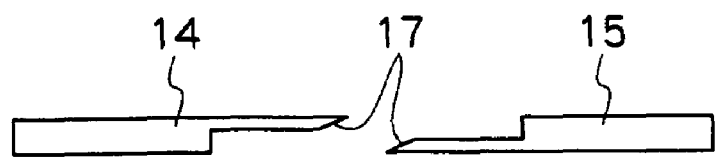
FIG. 1D is an explanatory drawing of an example of a variation of distal end portions of a flat plate in FIG. 1A.
Figure 2:
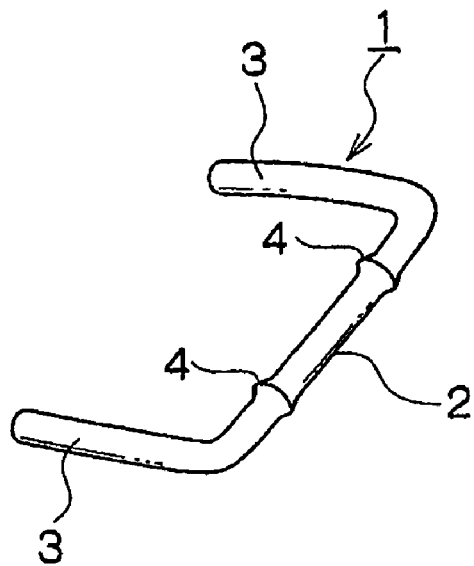
FIG. 2 is an explanatory drawing showing one example a conventional lateral displacement preventing device.
Figure 3:
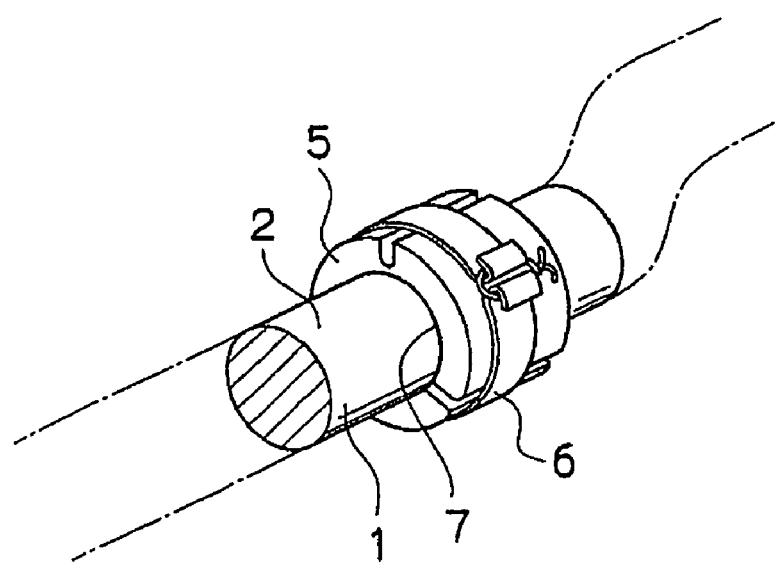
FIG. 3 is a perspective view showing another example of a conventional lateral displacement preventing device.
Figure 4:
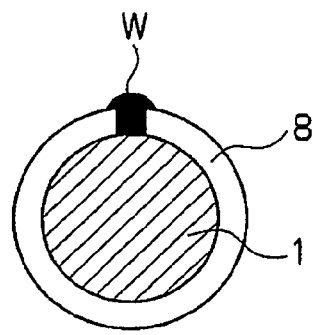
FIG. 4 is a sectional view showing still another example of a conventional lateral displacement preventing device.
Figure 5:
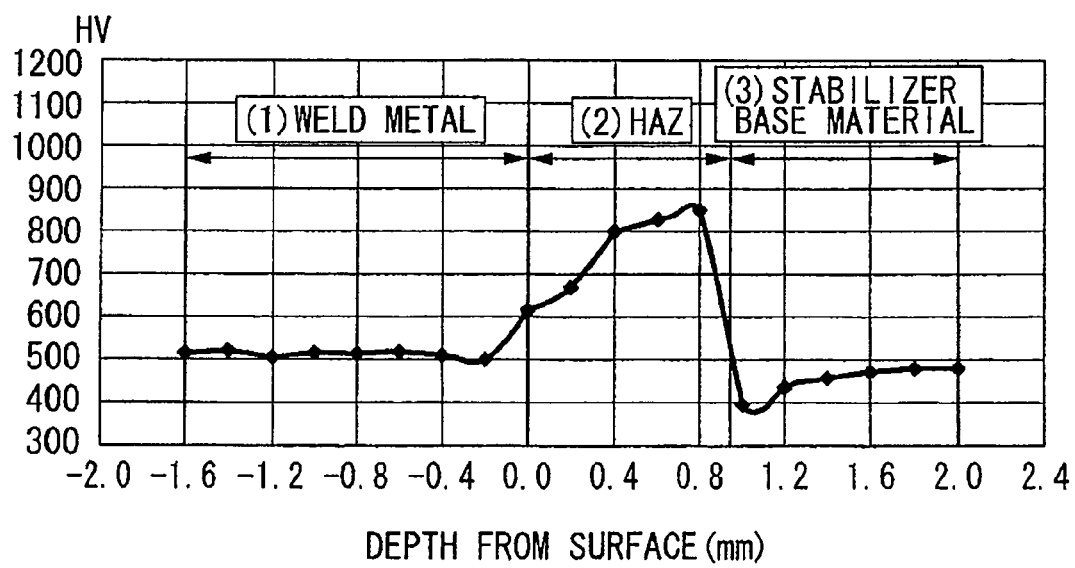
FIG. 5 is a graph showing a surface hardness of the lateral displacement preventing device according to FIG. 4.
Figure 6A:
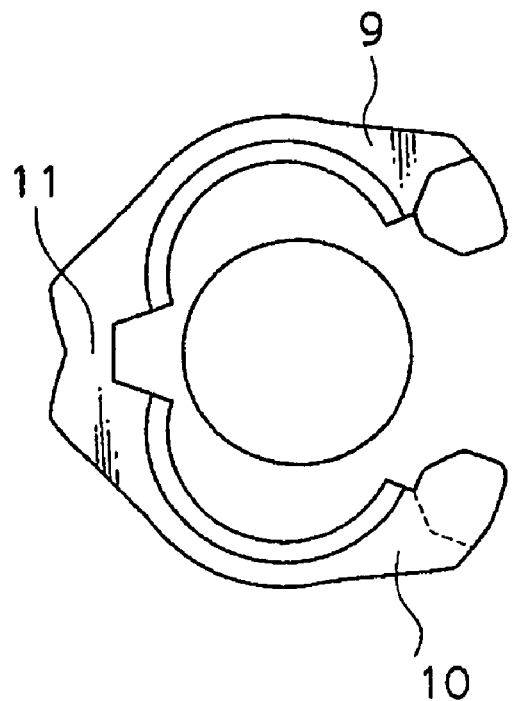
FIG. 6A is an explanatory drawing showing yet another example of a conventional lateral displacement preventing device.
Figure 6B:
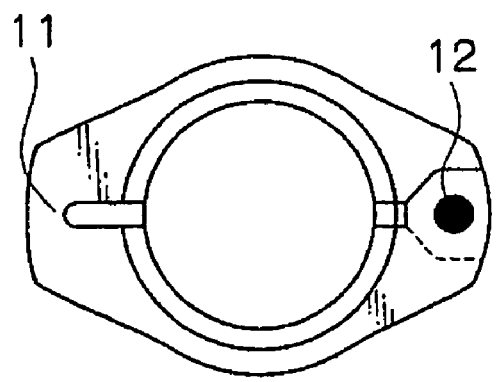
FIG. 6B is an explanatory drawing showing the lateral displacement preventing device of FIG. 6A.

Embodiments of the present invention are shown in FIGS. 1A to 1D, and FIG. 1A shows a relationship between a stabilizer 1 and a flat plate 13 that is used in the present invention. The flat plate 13 is machined in a C-shape in advance and has a length such that it can be clamped and tightly bound to the stabilizer 1. At both ends at the left and right, cut-out step portions 14,15 are provided in vertical symmetry. That is, two cut-out step portions are provided including the cut-out step portion 14 formed by recessing an upper surface side (i.e., a side which contacts the stabilizer 1) of an end portion (first end portion), at the left side in FIG. 1A, of the flat plate 13, and the cut-out step portion 15 formed by recessing a lower surface side (i.e., a side opposite from the upper surface) of an end portion (second end portion), at the right side in FIG. 1A, of the flat plate 13. A state in which the flat plate 13 is clamped to the stabilizer 1 is shown in FIGS. 1B and 1C. In FIG. 1B, the flat plate 13 has been clamped and fixed by welding by using butting surfaces of a distal end of the cut-out step portion 14 and a base portion of the cut-out step portion 15 as a weld portion 16. In FIG. 1C, fixing has been carried out by using a substantially central position of overlapping portions of the cut-out step portions 14 and 15 as the weld portion 16. Particularly in the case of FIG. 1C, when a recessed portion is provided or a hole having a diameter of 2 to 4 mm is formed, in advance, at the cut-out step portion 14 side of the weld portion 16, the welding becomes easy. Further, in either case, the distal end portions of the cut-out step portions 14,15 may be formed as chamfers 17, as shown in FIG. 1D, to facilitate overlapping at the time of clamping.

Figure 7:
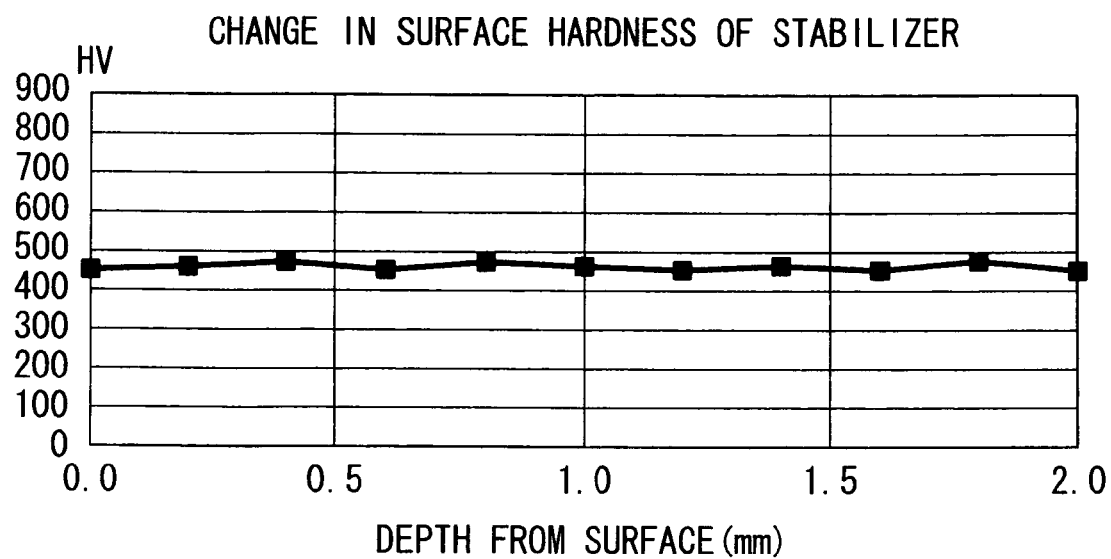
FIG. 7 is a graph showing change in surface hardness of a weld portion in a lateral displacement preventing device according to an embodiment of the present invention.

In either case, since there is no gap reaching the surface of the stabilizer 1 at the weld portion, heat does not directly strike the surface, change in the state of the surface is prevented, and effects on the durability life span are reduced. FIG. 7 is a graph showing the change in the surface hardness of the stabilizer at the weld portion in the present invention. As shown therein, in the case of the present invention, there is little change in hardness of the surface hardness of the stabilizer depending on a depth from the surface. Accordingly, there is no portion that becomes an origin of breakage, and the durability life span is lengthened.

Figure 8:
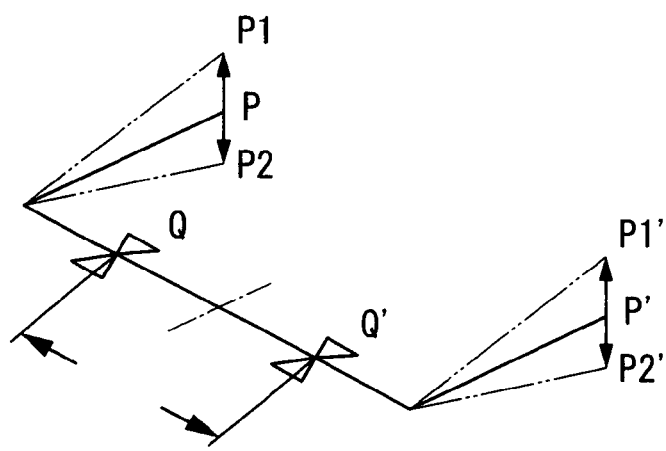
FIG. 8 is a drawing for explaining a durability testing method.

Next, a durability test was carried out by vibrating the stabilizer. This vibration state will be explained on the basis of FIG. 8. Point Q and point Q' of the stabilizer are supported, and point P and point P' of a distal end portion of an arm portion are vibrated. In a case where there is influence from welding at anti-displacement ring mounting positions at the time of mounting of the rings, the surface hardness of the stabilizer is reduced, and this becomes an origin of breakage due to stress concentration. Moreover, because the anti-displacement ring mounting positions are often in the vicinity of point Q and point Q' and are close to positions at which torsion generated stress due to vibration of the stabilizer is highest, this markedly reduces the durability life span.

In the case of the present invention, since there is no influence from welding, the durability life span is improved. For example, in the case of conventional products, the products are subjected to influence from welding, and thus the durability life span thereof is deteriorated by about 40% with respect to the durability life span of the present invention.

In the present invention, not only is production easy since the structure of the present invention is simple, but the stabilizer is not altered since there is little effect due to heat at the time of welding. Further, since there is no projecting portion for the welding, this is advantageous for securing space.

What is claimed is:

1. A lateral displacement preventing device for a stabilizer, the device comprising:
   a flat plate having a first end portion and a second end portion, and having an upper surface which contacts the stabilizer and a lower surface at a side that is opposite from the upper surface; and
   cut-out step portions formed by recessing of the each of an upper surface of the first end portion and a lower surface of the second end portion so as to be substantially flat along an outer periphery of the stabilizer,
   wherein the flat plate is wrapped, along a surface of the plate, around the outer periphery of the stabilizer at a predetermined position thereon and clamped, the cut-out step portions are overlapped, and both of the end portions are fixed at overlapping portions thereof, and
   wherein the fixed portion is a weld portion formed by welding, and the weld portion is formed at a substantially central position of overlapping portions of the cut-out step portion of the first end portion and the cut-out step portion of the second end portion, wherein the weld portion only extends through the cut-out step portion of the first end portion and into the cutout step portion of the second end portion.

2. A lateral displacement preventing device for a stabilizer according to claim 1 wherein a recessed portion is provided at a position, on the cut-out step portion of the first end portion, corresponding to the weld portion.

3. A lateral displacement preventing device for a stabilizer according to claim 2, wherein a distal end of the first end portion and a distal end of the second end portion are chamfered.

4. A lateral displacement preventing device for a stabilizer according to claim 1, wherein a hole is provided at a position, on the cut-out step portion of the first end portion, corresponding to the weld portion.

5. A lateral displacement preventing device for a stabilizer according to claim 4, wherein a distal end of the first end portion and a distal end of the second end portion are chamfered.

6. A lateral displacement preventing device for a stabilizer according to claim 1, wherein a distal end of the first end portion and a distal end of the second end portion are chamfered.

7. A method of producing a lateral displacement preventing device for a stabilizer, the method comprising:
   providing a flat plate having a first end portion and a second end portion, and having an upper surface which contacts the stabilizer and a lower surface at a side that is opposite from the upper surface;
   recessing an upper surface of the first end portion to form a cut-out step portion;
   recessing a lower surface of the second end portion to form a cut-out step portion;
   wrapping the flat plate, along a surface of the plate, around an outer periphery of the stabilizer at a predetermined position thereon so that the cut-out step portion of the first end portion and the cut-out step portion of the second step portion are overlapped, and clamping the flat plate;
   fixing overlapping portions of the cut-out step portions by welding; and
   carrying out the welding at a substantially central position of overlapping portions of the cutout step portion of the first end portion and the cut-out step portion of the second end portion, wherein the weld portion only extends through the cut-out step portion of the first end portion and into the cut-out step portion of the second end portion.

8. A lateral displacement preventing device for a stabilizer, the device comprising:
   a flat plate having a first end portion and a second end portion, and having an upper surface which contacts the stabilizer and a lower surface at a side that is opposite from the upper surface; and
   cut-out step portions formed by recessing of the each of an upper surface of the first end portion and a lower surface of the second end portion so as to be substantially flat along an outer periphery of the stabilizer,
   wherein the flat plate is wrapped, along a surface of the plate, around the outer periphery of the stabilizer at a predetermined position thereon and clamped, the cut-out step portions are overlapped, and both of the end portions are fixed at overlapping portions thereof,
   the fixed portion is a weld portion formed by welding, and
   the weld portion is formed between a distal end of the cut-out step portion of the first end portion and a base portion of the cut-out step portion of the second end portion, wherein the weld portion only extends across the cut-out step portion of the first end portion and into the cut-out step portion of the second end portion.

9. A lateral displacement preventing device for a stabilizer according to claim 8, wherein the distal end of the first end portion and the distal end of the second end portion are chamfered.

10. A lateral displacement preventing device for a stabilizer according to claim 8, wherein the weld portion is formed between a butting surface of the distal end of the cut-out step portion of the first end portion which is positioned at an upper side in the overlapping portion and a butting surface the base portion of the cut-out step portion of the second end portion which is positioned at a lower side in the overlapping portion.

11. A method of producing a lateral displacement preventing device for a stabilizer, the method comprising:
   providing a flat plate having a first end portion and a second and portion, and having an upper surface which contacts the stabilizer and a lower surface a side that is opposite from the upper surface;
   recessing an upper surface of the first end portion to form a cut-out step portion;
   recessing a lower surface of the second end portion to form a cut-out step portion;
   wrapping the flat plate along a surface of the plate around an outer periphery of the stabilizer at a predetermined position thereon so that the cut-out step portion of the first end portion and the cut-out step portion of the second step portion are overlapped, and clamping the flat plate;
   fixing overlapping portions of the cut-out step portions by welding; and
   carrying out the welding at a portion between a distal end of the cut-out step portion of the first end portion and a base portion of the cut-out step portion of the second end portion, wherein the weld portion only extends across the cut-out step portion of the first end portion and into the cut-out step portion of the second end portion.

12. A method of producing a lateral displacement preventing device for a stabilizer according to claim 11, wherein the distal end of the first end portion and the distal end of the second end portion are chamfered.

13. A method of producing a lateral displacement preventing device for a stabilizer according to claim 11, wherein the welding is carried out at a portion between a butting surface of the distal end of the cut-out step portion of the first end portion which is positioned at an upper side in the overlapping portion and a butting surface the base portion of the cut-out step portion of the second end portion which is positioned at a lower side in the overlapping portion.

* * * * *